United States Patent
Skibinski et al.

(10) Patent No.: US 6,359,554 B1
(45) Date of Patent: Mar. 19, 2002

(54) MOTOR VEHICLE DASHBOARD INDICATORS WITH AN INTELLIGENT COMPUTER NETWORK INTERFACE

(75) Inventors: John Robert Skibinski, Hubertus; Edward Francis Buck, Waldo, both of WI (US); Norman John Colle, Carmel, IN (US); Alan Robert Coloske, Milford, MI (US); Michael John Drapac, Coralville, IA (US); John Edmund Dunne, Cornelius, NC (US); Charles John Luebke, Sussex, WI (US); David Mark Nelsen, Mequon, WI (US); Edwin Eames Pickens, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/657,672

(22) Filed: Sep. 8, 2000

(51) Int. Cl.$^7$ .................................................. B60R 1/00
(52) U.S. Cl. .......................... 340/438; 340/461; 701/36
(58) Field of Search ................... 340/438, 459, 340/461, 462; 701/1, 36, 99; 709/200, 223

(56) References Cited

U.S. PATENT DOCUMENTS

| | | | |
|---|---|---|---|
| 4,648,290 A | | 3/1987 | Dunkley et al. |
| 5,317,688 A | * | 5/1994 | Watson et al. ............... 395/337 |
| 5,471,459 A | * | 11/1995 | Gut ........................ 340/825.34 |
| 5,839,534 A | | 11/1998 | Chakraborty et al. |
| 5,909,545 A | * | 6/1999 | Frese, II et al. ............. 709/208 |
| 5,959,569 A | | 9/1999 | Khodabhai |
| 6,023,724 A | * | 2/2000 | Bhatia et al. ................ 709/218 |
| 6,085,224 A | * | 7/2000 | Wagner ....................... 709/203 |

* cited by examiner

*Primary Examiner*—Edward Lefkowitz
(74) *Attorney, Agent, or Firm*—George E. Haas; Quarles & Brady LLP

(57) ABSTRACT

An indicator unit is provided to display information to occupants in a motor vehicle. The indicator unit is adapted for connection to a communication network and intercepts messages that carry data between other vehicle equipment. A control circuit is programmed to identify the existing network messages that carry the data needed for the information display. The control circuit operates a display device in response to received data. Because the indicator eavesdrops on the network and intercepts existing data messages, other equipment in the motor vehicle do not have to be programmed to communicate specifically with the indicator. This facilitates adding specific indicators to a particular truck.

14 Claims, 2 Drawing Sheets

MOTOR VEHICLE DASHBOARD INDICATORS WITH AN INTELLIGENT COMPUTER NETWORK INTERFACE

BACKGROUND OF THE INVENTION

The present invention relates to on-board computer networks in a motor vehicle, and to displaying information regarding operation of the motor vehicle.

Computer systems are incorporated into motor vehicles, such as long haul semi-trailer trucks for engine control, transmission operation, logging driver data and truck maintenance information and occupant comfort systems for example. The various computers are connected to a communication network that runs throughout the truck for the exchange of data and commands.

Some of the computers have dedicated control panels with input and display devices connected directly to the computer. In other cases, information about the truck's performance is sent from the computers to a common display panel on the dashboard. That display panel typically includes a computer monitor screen and function selection switches. The information to be displayed has to be obtained by the display panel from the specific computer that controls the related vehicle function. This requires that the computers be programmed to transmit data messages periodically to the display panel, or that the display panel periodically requests the necessary data from those computers. In either situation, the vehicle computers have to be specifically programmed to communicate with the control panel.

Some trucks include a navigation system which utilizes signals from the Global Positioning System (GPS) to determine the present location of the truck and provided driving instructions to a desired destination. The navigation system typically incorporates a dedicated two dimensional display, similar to a computer screen, on which a map is displayed.

A truck also may have a collision avoidance system that senses the presence of other vehicles in close proximity in front of and behind the truck. This system also has dedicated display and warning devices. Because these types of sophisticated systems each has its own dedicated display it may be difficult to integrate those displays into the existing dashboard of a truck.

Although a significant amount of information is being exchanged among the truck's computers, much of that information is not displayed to the driver. For example the actual pressure sensed for each of the tires may not be available for display, only a warning indication occurs when the pressure in a tire becomes to low. Individual drivers or trucking companies may desire that different ones of these other operational parameters be displayed. That requires custom reprogramming of the display panel and other computers in the vehicle. In addition, because dashboards typically have a integrated display devices, customizing a particular truck to display other operating parameters can necessitate creation of an entirely new dashboard layout, which is cost prohibitive for all but large volume truck purchasers.

In addition, a truck owner may desire to upgrade an older truck by adding a display panel, a navigation system or collision avoidance apparatus. However, this requires finding an area on the dashboard that is large enough to locate the driver interface components of such equipment. The existing computers in the truck also must be reprogrammed to send data messages to a newly added display panel. Thus adding after market equipment may be difficult to accomplish in a given truck.

SUMMARY OF THE INVENTION

A motor vehicle has numerous devices which exchange messages over a communication network. An indicator for the motor vehicle includes a circuit that is connected to the communication network and intercepts messages which are intended for receipt by a given device other than the indicator. The control circuit controls a display device to present information to the occupant of the motor vehicle in response to contents of the messages which are intercepted.

The operation of indicators, that eavesdrop on network messages, is defined by the protocol by which the messages are sent. In a common protocol, data is transmitted in a message packet that contains an address of the given device intended to receive the data, identification of an operating parameter of the motor vehicle, and a data value for that operating parameter. For this type of protocol, the control circuit intercepts message packets having a specific address. In other embodiments, the control circuit intercepts message packets having the identification of a predefined operating parameter.

Because this indicator uses data carried by messages already being sent between other devices on the network, network devices do not have to be programmed to send data specifically to the indicator. In fact, the indicator may not even require it own network address. This facilitates the addition of indicators to a vehicle as only the new indicator has to be configured to intercept messages carrying the data needed for the display of the information.

DETAILED DESCRIPTION OF THE INVENTION

Figure 1:
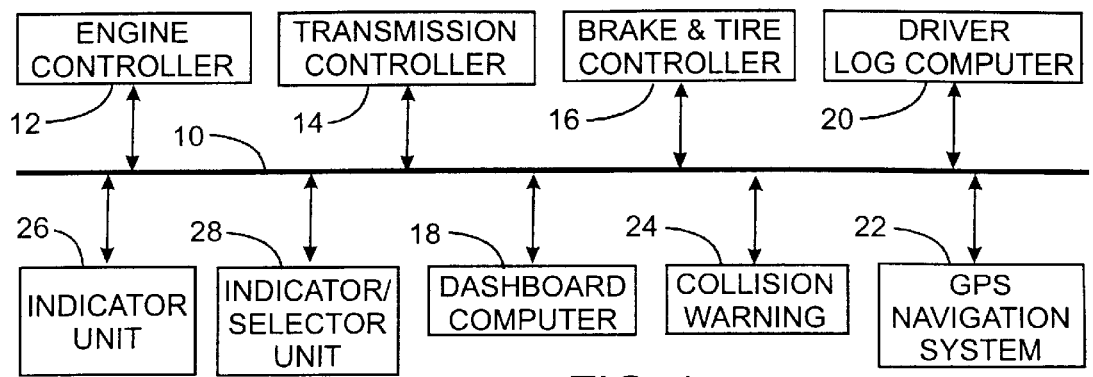
FIG. 1 is a block schematic diagram of an exemplary motor vehicle computer network on which the present invention is implemented.

With initial reference to FIG. 1, the electronic control circuits for a large truck are connected to a communication network 10, which conforms to any of several standard bus protocols, such the J1939 or J1587 standards promulgated by the Society of Automotive Engineers (SAE). Alternatively, the present invention may be utilized with a proprietary communication network developed by an individual vehicle manufacturer. The communication network 10 runs throughout the vehicle and links intelligence sensors and computers with other electrical and electromechanical components. For example, the engine has a separate computer controller 12 which receives input signals from various sensors and responds by operating actuators that control specific engine functions. Another controller 14 provides similar control of the transmission that couples the engine to the rear axle of the truck. Operation of the brakes is governed by a separate controller 16 which also measures the pressures of the tires on the vehicle.

Components on the dashboard, which display vehicle operating information, such as speed, engine RPM and warning indications, are interfaced to a dashboard computer 18 that receives information from sensing circuits and other controllers connected to the communication network 10. Driver activated switches provide input signals which cause the dashboard computer 18 to issue commands over the network 10 to other components in the truck.

Governmental regulations require that the driver keep a log of driving activity and fuel tax calculations. This information is stored and tabulated within a driver log computer 20, as will be described.

A navigation system 22 based on the Global Positioning System (GPS) also is connected to the communication network 10. A GPS module periodically receives signals from several earth satellites and uses those signals to determine the exact location of the truck. The truck's location then is employed to plot the best route for the truck to take to a destination that is designated by the driver and provide driving instructions to a desired destination.

Another sophisticated system 24 warns of a potential collision. For this function, sensors (not shown) are provided at the front and rear of the truck to sense when an object, such as another vehicle or a loading dock, is in close proximity. The collision warning system 24 is connected to the communication network 10 and may be similar to the apparatus described in U.S. Pat. Nos. 5,839,534 or 5,959,569, the description of which is incorporated herein by reference. In performing the collision warning function, system 24 exchanges information over the communication network with other controllers in the truck. For example, the automatic collision warning system communicates with the cruise control function provided by the engine controller 12 in order to automatically slow the truck when another vehicle is too close ahead.

As noted previously, many of these computerized devices, for example, the engine controller 12 and transmission controller 14, exchange information with each other over the communication network 10. For that data exchange, each device 12–24 on the communication network 10 has a unique address assigned to it. Data and commands are sent as a message packet addressed to a particular recipient device on the network. The message packet transmitting data contains the network addresses of the intended recipient and the originator, an identification of the data parameter (e.g. voltage, coolant temperature, brake system pressure), and the value of that data parameter. Each network device 12–24 listens for message packets that contain its address in the recipient field of the message packet. Upon hearing an appropriately addressed message, the given device stores the packet for further processing.

Messages of global importance are of interest to many devices on the vehicle and are "broadcast" over the communication network 10. For example information that the truck's electrical voltage is below a satisfactory level needs to be known by many controllers throughout the vehicle. In this case, the recipient address field of the message packet contains a predefined address that indicates the global nature of the message. Each device 12–24 on the communication network also is programmed to store a globally addressed message and respond to its contents. Thus these network devices 12–24 are programmed to receive only messages that are specifically addressed to it or which are broadcast for general use.

In addition to standard indicators controlled by the dashboard computer 18, several novel intelligent indicator units 26 and indicator/selector units 28 are incorporated into the dashboard and connected directly to the communication network 10. As will be described, these devices are compact and occupy the same amount of space as a standard rocker switch, commonly used on truck dashboards. Therefore, these units 26 and 28 can be mounted in a conventional dashboard, either during vehicle manufacture or as an after market installation, without resigning the dashboard layout. The standard size of the units allows different ones of them to be incorporated in a particular truck as desired by the owner. The indicator unit has only an information display, whereas the indicator/selector unit 28 provides both a display and a driver operable input device.

Figure 3:
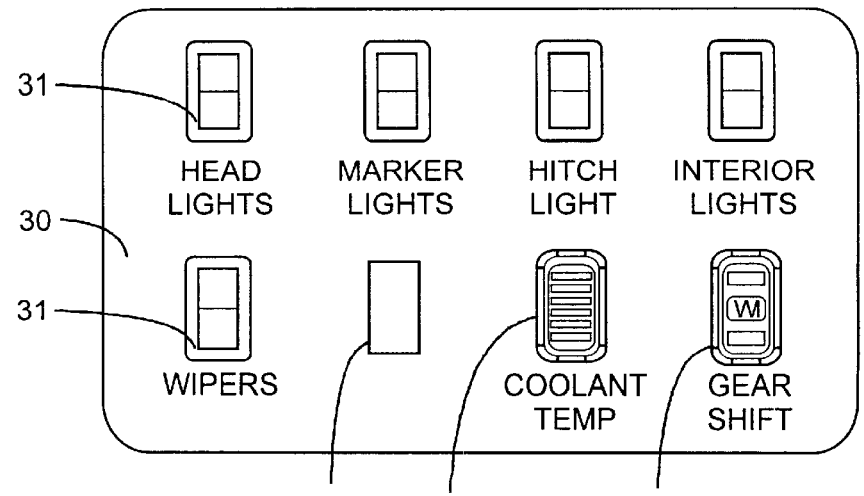
FIG. 3 illustrates a section of a truck dashboard on which an indicator unit is mounted.

FIG. 3 depicts a switch panel 30 which is part of the truck dashboard. The switch panel 30 has a plurality of predefined locations for receiving a plurality of rocker switch 31 with the cutout at an unused location being designated by numeral 32. An indicator unit 26 and an indicator/selector unit 28 are mounted in two of the predefined switch locations.

Figure 4:
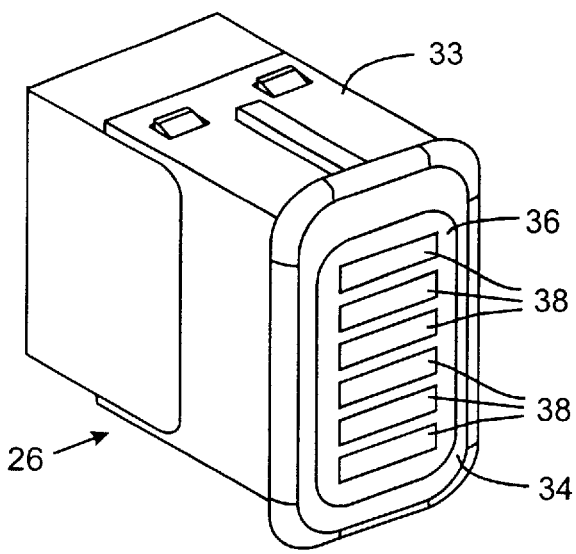
FIG. 4 is an isometric view of the intelligent indicator unit.

FIG. 4 illustrates the overall appearance of the indicator unit 26, which has a sealed housing 33 containing electronic circuitry for interfacing to the communication network 10. The housing 33 extends through a standard sized rectangular switch aperture in the dashboard with a front panel 34 being visible the driver. The a front panel 34 includes an electrical display 36. The same housing 33, shown for the indicator unit 26, also is used for the indicator/selector unit 28. For this latter type of device, both display elements and input switches are mounted on the front panel 34, as will be described.

Figure 2:
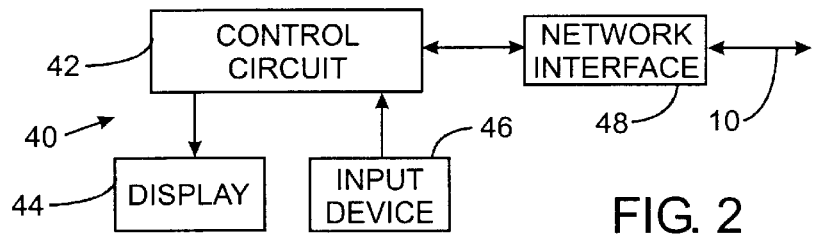
FIG. 2 is a diagram of the circuitry of an intelligent indicator unit according to the present invention.

With reference to FIG. 2, the electronic circuitry 40 of the indicator unit 26 includes a control circuit 42 which preferably comprises a conventional microcomputer. The microcomputer contains a microprocessor, internal memory for storing programs executed by the microprocessor and the data utilized by those programs, and input/output circuits for interfacing external components to the microprocessor. Some of the input/output circuits produce signals which operate a display 44 of the indicator unit 26 or the indicator/selector unit 28. The electronics 40 for indicator/selector unit 28 also include an input circuit 46 which has one of more input devices, such as a pushbutton switch, by which the truck operator can indicate that a designated function should be performed.

The control circuit 42 is connected to the communication network 10 by a network interface circuit 48 which converts the data between the parallel format utilized by the microcomputer 42 and the serial format of the particular protocol employed by the communication network. Such network interface circuits 48 are commercially available for the various industry standard protocols utilized by truck communication networks.

The indicator unit 26 illustrated in FIG. 4 has a bar graph range/level display 36 on the front panel 34, which can be used to indicate the relative value of a parameter, such as temperature, pressure, voltage, current, and fluid levels. The particular parameter is designated by a printed legend (not shown) on the front panel. This display 36 is formed by a plurality of light emitters 38 stacked vertically. All the light emitters 38 may be the same color or their colors may vary, for example from pure green at the bottom to lighter shades of green going upward, then to yellow and orange, and finally to red at the top of the display. The number of light emitters 38 which are illuminated and the color of the highest one indicates the relative magnitude of the operating parameter being displayed. For example, this type of indicator unit 26 can be employed to display the temperature of the engine coolant. When the coolant temperature is within the normal operating range only a few of the green light emitters 38 at the bottom of the front panel 36 are illuminated. As the coolant temperature increases, more of the light emitters 38 are activated going vertically up the front panel 36 and when the coolant temperature reaches a dangerous level red light emitters at the top of the display illuminate as a warning indication to the driver. Thus, the driver is able to quickly glance at the indicator unit 26 and by the number of indicators and their respective colors quickly ascertain whether or not the temperature of the engine coolant is within the satisfactory operating range.

In order to determine which light emitters to activate, indicator unit 26 listens to messages transmitted over the communication network 10. However, unlike many of the devices connected to the network, the typical indicator unit 26 does not listen for messages that are specifically addressed to it. In fact, the indicator unit 26 does not have its own network address. Instead, the network interface 48 in FIG. 2 transfers every message carried by the communication network 10 to the microcomputer 42 and the microcomputer is programmed to process only messages which contain data for the designated parameter, for example engine coolant temperature. As stated previously, network messages have a field which designates a particular operating parameter. When such message is found that contains the parameter to be used by the indicator unit 26, the microcomputer 42 reads the value contained in the data field of the message. That value is compared to several threshold levels to determine which ones of the light emitters 38 to illuminate.

Because the indicator unit 26 does not require that data messages be specifically addressed to it, other components and devices on the communication network 10 do not have to be reprogrammed in order to provide this indication function. The indicator unit 26 need only be programmed to recognize the data messages already being transmitted over the network which carry the particular parameter to be displayed between other devices. This is advantageous when it is desired to add a particular indicator as an after market feature. In that case, one need only find an available standard sized switch opening in the dashboard and a connection to the communication network 10. Thus the indicator unit 26 can display any gauge parameter or digital value (e.g. trip distance, miles per gallon, etc.) that are available on the communication network. The indicator unit 26 can intercept messages from controllers produced by different manufacturers as long as the necessary message and data formats are known.

For some applications of these intelligent indicators, the particular parameter is not already being transmitted on the communication network 10. For example, exhaust oxygen content may be detected by a sensor that is connected directly to the engine controller 12 and because only that controller needs that data, it is not sent over the network. Here in order for an indicator unit 26 to display exhaust oxygen content, the indicator unit 26 could be assigned a network address and request the information from the engine controller 12 or another device could make that request on behalf of the indicator unit. Alternatively, the engine controller 12 could be reprogrammed to transmit that data periodically on the communication network 10. Such a message could be sent by assigning a unique network address to the indicator unit 26 and addressing exhaust oxygen content data messages to that indicator unit.

Alternatively, it is not necessary to assign an unique network address to the indicator unit 26 where the engine controller 12 is reprogrammed to broadcast the parameter data over the network. In this case, the indicator unit 26 eavesdrops on the network and intercepts the broadcast messages containing the engine temperature value. The other devices on the network will ignore the broadcast messages as they as not programmed to use data for this particular parameter.

Figure 5:
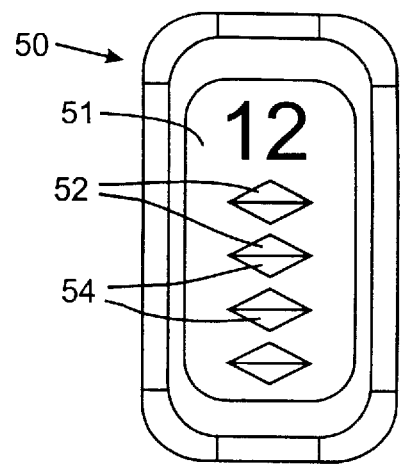
FIGS. 5 and 6 illustrate two display panels for different intelligent indicator units.

The display characteristics of the front panel 36 on the indicator unit 26 may vary depending upon the specific parameter or function being indicated. FIG. 5 illustrates a front panel 51 for a gear shift indicator unit 50 having a large numerical display indicating the particular gear ratio which is currently engaged in the truck transmission (e.g. the twelfth gear ratio). The gear ratio number is displayed utilizing a two character alphanumeric liquid crystal display that is backlit with LED's, although other types of displays may be used. As the driver shifts the transmission up and down, this number changes to indicate the gear ratio currently in use.

Beneath the numerical display are a plurality of upward and downward pointing triangular arrow heads 52 and 54 respectively, each of which is independently illuminated by the microcomputer 42. The number of upward pointing arrows illuminated at any point in time indicates the number of gear ratios to which the driver may shift from the present gear. For example, the driver may be able to shift upward directly from second gear ratio into the third, fourth, fifth, or sixth gear ratio, depending upon the load carried by the truck. That is, the driver may be able to shift directly from the second gear ratio into fifth gear ratio without going through third and fourth gear ratios. In higher numbered gear ratios, the transmission is only capable of being shifted upward one or two gear ratios which is indicated by the illumination of only two upward pointing arrowheads. Similarly, the number of downward pointing arrowheads indicates into how many gear ratios the driver is able to shift directly from the present gear ratio.

The data used by the microcomputer 42 to determine the number of arrowheads to illuminate in this indicator unit 50 is obtained directly from messages sent by the transmission controller 14 over the communication network 10. The truck may incorporate a transmission that is operated by a semi— automatic controller, such as the one described in U.S. Pat. No. 4,648,290, the description of which is incorporated herein by reference. That type of transmission controller 14 is programmed with an algorithm that determines a range of gear ratios to which a direct shift is permitted from the current gear ratio, based upon signals from sensors on the engine and the transmission. Thus the engine controller 12 and the transmission controller 14 exchange operating information via the communication network 10. Although the driver operates a lever to indicate the specific gear ratio into which to shift, the transmission controller performs the gear change, which involves electrically operating the clutch, gear shifter and engine throttle. Thus the semi-automatic transmission controller 14 already is sending the information needed by the indicator unit 50 over the communication network 10.

However, the transmission controller 14 in many trucks is not so sophisticated and only a designation of the current gear is transmitted onto the communication network 10. In this latter situation, the gear shift indicator unit 50 is programmed to determine how many arrowheads to illuminate in response to eavesdropping on the communication network to obtain the designation of the current operating gear sent by the transmission control 14. The transmission indicator unit 50 does not require network messages be specifically addressed to that indicator unit.

Figure 6:
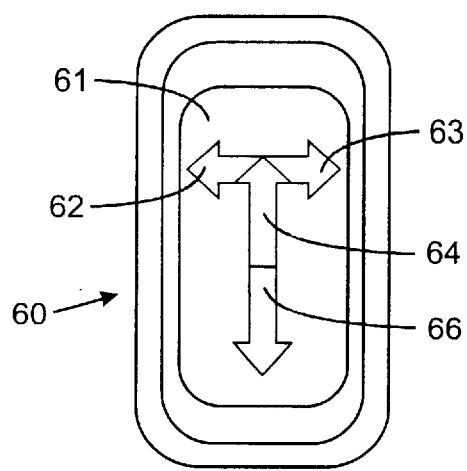

FIG. 6 illustrates the front panel 61 for a navigation turn-by-turn indicator unit 60 that receives signals from the GPS navigation system 22. Such navigation systems 22 are common in many types of motor vehicles and utilize signals from satellites of the Global Positioning System to derive the precise location of the vehicle. That location then is employed by the navigation system 22 to determine the route for the vehicle to travel to a destination that has been selected by the driver. Conventional navigation systems utilize a two dimensional image display to present a map indicating the route that the vehicle is to follow. However, this display requires that the driver turn away from viewing the road and study the map to learn the indicated route. A driver's prolonged diversion of attention away from the road is potentially hazardous.

The turn-by-turn indicator unit 60 provides a simplified display that instructs the driver how to operate the vehicle in order to follow the route designated by the navigation system. The indicator 60 incorporates left and right turn arrows 62 and 63, as well as a straight ahead indicator arrow 64. A reverse arrow 66 is provided to indicate when the vehicle has driven past an intersection at which a turn should have been executed.

Unlike the previously described indicator units, it is unlikely that the necessary turn indication data already is being transmitted over the communication network 10, so the turn-by-turn indicator 60 can not function merely by eavesdropping on the network. Instead, the GPS navigation system 22 sends turn data in messages that are specifically addressed to turn-by-turn indicator 60. This data is used by the indicator unit 60 to determine which of the arrows 62–66 should be illuminated. Specifically, the front panel display indicates that the vehicle is to travel forward by illuminating the straight ahead arrow 64. A predefined distance before a turn is to occur, the left or right turn arrow 62 and 63 will illuminate. When the turn is completed the turn arrow is extinguished and the straight ahead arrow 64 illuminates again.

Long-haul trucks pay highway use taxes to each state of the United States based on the number of miles driven in each jurisdiction. Therefore, the driver is required to maintain accurate records of the truck's travel. This conventionally has been done by manually recording the mileage reading from the truck's odometer in a written log each time the truck crosses a state boundary and employing those mileage readings to calculate the number of miles driven in each state. During a given reporting the period the miles from each trip then must be totaled by state to determine the amounts of highway use taxes that are due.

Figure 7:
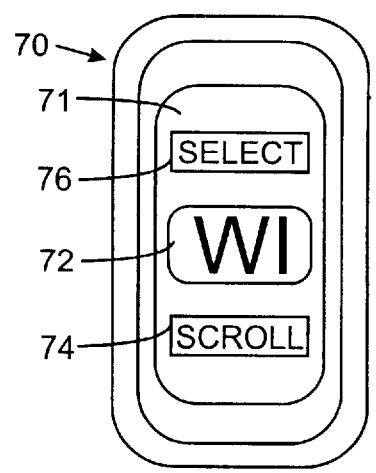
FIG. 7 illustrates a display panels for an intelligent indicator/selector unit.

FIG. 7 shows an embodiment 70 of an indicator/selector unit 28 which is utilized by the driver to input information into the driver log computer 20 for calculating highway use taxes. Alternatively, the highway use tax function can be provided entirely by the indicator/selector unit. This particular indicator/selector unit 70 has a front panel 71 with a two character alphanumeric display 72 that shows a two letter abbreviation for each state and the District of Columbia. For example, the illustrated unit is displaying the letters WI for the state of Wisconsin. For trucks driven internationally, the indicator/selector unit 70 can be programmed to record mileage driven in different countries.

The front panel 71 also has a first pushbutton switch 74 which is designated by the legend "SCROLL". This switch is activated by the operator to signal the microcomputer 42 to change the state designation, shown in display 72. Repeatedly pressing the first pushbutton switch 74 causes the display to scroll through a list of all of the highway use taxing jurisdictions. By pressing a second pushbutton switch 76 the driver indicates to the microcomputer 42 that the presently displayed state designation is to be selected. Although one could scroll through all the governmental territories in the United States which levy highway taxes, such would be rather cumbersome. Therefore, the microcomputer 42 is programmed with a data table that designates the other states which border the state that was previously selected. Thus, if the currently selected state is Wisconsin, pressing the first pushbutton switch 74 causes the abbreviations for Minnesota, Michigan, Iowa, and Illinois to be displayed sequentially. This greatly facilitates data entry when traveling across a state border. Thus, if the truck crosses the boundary from Wisconsin into Minnesota, the driver presses the first pushbutton switch 74 (SCROLL) until the letters MN for Minnesota appear and then the second pushbutton switch 76 is pressed to select the displayed state. This provides a signal to the microcomputer 42 that the truck has exited Wisconsin and entered Minnesota.

If the logging is to be accomplished in the driver log computer 20, the microcomputer 42 within the indicator/selector unit 70 formulates a data message designating the new state into which the truck has entered. That message is then sent via the network interface 48 onto the communication network 10 to the driver log computer 20 which then processes the information to record the appropriate mileage entries.

When the entire highway tax logging function is incorporated into microcomputer 42, the indicator/selector unit 70 responds to crossing a state border by listening on the communication network 10 for a message containing the truck odometer reading. Such messages emanate from either the transmission controller 14 to which the speedometer sensor is connected or from the dashboard computer 18 depending upon which devices calculates miles driven. The odometer reading is recorded in the indicator/selector microcomputer 42 as the entry mileage for the state of Minnesota and that mileage utilized along with the previous entry mileage for the state of Wisconsin to calculate the amount of miles driven in Wisconsin. That amount of miles then is added to the cumulative miles driven in Wisconsin contained in storage location in the memory of microcomputer 42. That memory has similar storage locations for all the highway taxing jurisdictions in the United States. The time and date of the border crossing also may be stored in the memory.

Governmental regulations specify the maximum amount of time that the driver is able to continuously operate the truck and the amount of time that the driver must rest between periods of operation. Such regulations required drivers to keep a log of their operating and rest periods in order to verify compliance with the regulations. This process can be automated by another indicator/selector unit 28 that is similar to the highway tax unit 70. In this other application, the display presents designations of different driver and the vehicle activities, for example driving, resting, and vehicle idling. Vehicle idling, which occurs during engine warmup, loading and unloading, must be logged in order to reconcile the driving hours with the total hours of engine operation.

The various activity classes are sequentially displayed by use of a SCROLL pushbutton switch and then chosen by operating a SELECT pushbutton switch as was done with the highway tax indicator/selector unit 70. This selection either is sent to a driver log computer 20 or this logging functionality can be programmed into microcomputer 42 of this indicator/selector unit. Upon each selection of a different entry into the driver log, the date and time of day also is recorded. This latter information is provided by a real-time clock in the truck which broadcasts that data over the communication network 10.

The driver log computer 20 or another type of computer device on the communication network 10 provides an interface for downloading data from the truck controllers into an external computer. Thus, the driver log information can be transferred from the computer 20 to the computer system at offices of a trucking company in order to produce cumulative records for the driver, the specific truck and the trucking company as a whole. A cellular telephone modem also may be connected to the truck's communication network to provide a path for downloading this information.

We claim:

1. In a motor vehicle having a communication network which carries messages between devices in the motor vehicle, an indicator comprising:

a display device which presents information to an occupant of the motor vehicle; and a circuit connected to the communication network and intercepting messages which are intended for receipt by a given device other than the indicator, the control circuit controlling the display device to present information to the occupant in response to contents of the messages which are intercepted.

2. The indicator as recited in claim 1 wherein the messages transmitted over the communication network contain a unique address of the given device and wherein the circuit intercepts messages containing that unique address.

3. The indicator as recited in claim 2 wherein the messages also contain a data value, and the control circuit controls the display device in response to the data value in intercepted messages.

4. The indicator as recited in claim 1 wherein the messages transmitted over the communication network contain an identification of an operating parameter of the motor vehicle, and the circuit intercepts messages containing an identification of a predefined operating parameter.

5. The indicator as recited in claim 4 wherein the messages also contain a data value for the operating parameter, and the control circuit controls the display device in response to the data value.

6. The indicator as recited in claim 1 wherein the data is transmitted in a message packet that contains an address of the other device, identification of an operating parameter of the motor vehicle, and a data value for the operating parameter.

7. The indicator as recited in claim 6 wherein the control circuit intercepts message packets having an identification of a predefined operating parameter.

8. The indicator as recited in claim 6 wherein the control circuit intercepts message packets having an address of the second network device.

9. The indicator as recited in claim 1 further comprising a human operable input device connected to the control circuit.

10. The indicator as recited in claim 9 wherein the control circuit responds to the human operable input device by transmitting a message over the communication network.

11. In a motor vehicle, an indicator which displays information in response to data transmitted via a communication network wherein a first network device addresses the data to a second address device other than the indicator, said indicator comprising:

an interface circuit which couples the indicator to the communication network;

a display device which presents the information to an occupant of the motor vehicle; and a control circuit connected to the interface circuit and to the display device, the control circuit intercepting data addressed to the second network device and controlling the display device to present information to the occupant in response to the data addressed to the second network device.

12. The indicator as recited in claim 10 wherein the data is transmitted in a message packet that contains an address of the second network device, identification of an operating parameter of the motor vehicle, and a data value for the operating parameter.

13. The indicator as recited in claim 12 wherein the control circuit intercepts message packets having an identification of a predefined operating parameter.

14. The indicator as recited in claim 10 wherein the data is transmitted in a message packet; and the control circuit intercepts message packets having an identification of a predefined operating parameter.

* * * * *